(12) United States Patent  
Hermann et al.

(10) Patent No.: US 12,123,461 B2  
(45) Date of Patent: Oct. 22, 2024

(54) HYDRAULIC BEARING

(71) Applicant: Sumitomo Riko Company Limited, Aichi (JP)

(72) Inventors: Waldemar Hermann, Jossgrund (DE); Bulut Ciftci, Steinau an der Straße (DE)

(73) Assignee: Sumitomo Riko Company Limited, Aichi (JP)

( * ) Notice: Subject to any disclaimer, the term of this patent is extended or adjusted under 35 U.S.C. 154(b) by 209 days.

(21) Appl. No.: 17/886,465

(22) Filed: Aug. 12, 2022

(65) Prior Publication Data

US 2023/0064766 A1 Mar. 2, 2023

(30) Foreign Application Priority Data

Aug. 25, 2021 (DE) ............ 10 2021 004 366.9

(51) Int. Cl.
*F16F 13/14* (2006.01)
*F16C 32/06* (2006.01)
*F16F 9/10* (2006.01)

(52) U.S. Cl.
CPC ............ *F16C 32/0685* (2013.01); *F16F 9/10* (2013.01)

(58) Field of Classification Search
CPC .......... F16F 9/10; F16F 13/14; F16F 13/1427; F16F 13/1418; F16F 13/1463
See application file for complete search history.

(56) References Cited

U.S. PATENT DOCUMENTS

| | | | | |
|---|---|---|---|---|
| 5,954,317 A * | 9/1999 | Meyer | ................. | F16F 13/1409 180/312 |
| 7,198,258 B2 * | 4/2007 | Sato | ................... | F16F 13/1409 267/140.13 |
| 7,275,738 B2 * | 10/2007 | Minamisawa | ...... | F16F 13/1409 267/141.2 |
| 10,422,404 B2 * | 9/2019 | Oniwa | ................ | F16F 13/1409 |
| 10,428,898 B2 * | 10/2019 | Hermann | ............ | F16F 13/1463 |
| 11,073,191 B2 * | 7/2021 | Suzuki | ................ | F16F 13/1418 |

(Continued)

FOREIGN PATENT DOCUMENTS

JP 2017172744 9/2017

OTHER PUBLICATIONS

"Office Action of German Counterpart Application", issued on Jun. 17, 2022, with English translation thereof, p. 1-p. 11.

*Primary Examiner* — Thomas W Irvin
(74) *Attorney, Agent, or Firm* — JCIPRNET

(57) ABSTRACT

According to the embodiment of the present disclosure, a hydraulic bearing (1) is provided, comprising an inner core (2), an outer shell (3) which radially surrounds the inner core (2), an elastomer body (4) which resiliently interconnects the inner core (2) and the outer shell (3) in order to allow a relative displacement between the inner core (2) and the outer shell (3), a first working chamber (5) and a second working chamber (6) which are fluidically interconnected by means of a working channel, a bypass chamber (8) which is connected to the first working chamber (5) by means of a first bypass channel (9), wherein the first working chamber (5) and the second working chamber (6) are configured such that an amount of a volume change in the case of a displacement of the inner core (2) relative to the outer shell (3), in a predetermined radial direction, is larger for the first working chamber (5) than for the second working chamber (6).

11 Claims, 9 Drawing Sheets

(56) References Cited

U.S. PATENT DOCUMENTS

| | | | | |
|---|---|---|---|---|
| 11,231,083 B2* | 1/2022 | Kojima | ................ | B60K 5/1208 |
| 11,446,999 B2* | 9/2022 | Kojima | .................. | F16F 13/16 |
| 11,448,285 B2* | 9/2022 | Werner | ................ | F16F 13/106 |
| 11,906,012 B2* | 2/2024 | Kim | .................... | F16F 13/1481 |
| 2005/0230889 A1* | 10/2005 | Minamisawa | ...... | F16F 13/1409 |
| | | | | 267/141.2 |
| 2018/0135722 A1* | 5/2018 | Oniwa | ................ | F16F 13/1409 |
| 2018/0156305 A1* | 6/2018 | Hermann | ............ | F16F 13/1463 |
| 2019/0309819 A1* | 10/2019 | Suzuki | .................... | F16F 13/14 |
| 2019/0389296 A1* | 12/2019 | Kojima | .................. | F16F 13/16 |
| 2020/0116226 A1* | 4/2020 | Kojima | ................ | B60K 5/1208 |
| 2020/0182327 A1* | 6/2020 | Werner | ............... | F16F 13/1427 |

* cited by examiner

HYDRAULIC BEARING

CROSS-REFERENCE TO RELATED APPLICATION

This application claims the priority benefits of German application no. 10 2021 004 366.9, filed on Aug. 25, 2021. The entirety of the above-mentioned patent application is hereby incorporated by reference herein and made a part of this specification.

TECHNICAL FIELD

The disclosure relates to a hydraulic bearing.

BACKGROUND ART

The present disclosure relates to a hydraulic bearing, in particular for use in a motor vehicle. The hydraulic bearing can for example be used for bearing an axle carrier or wheel link, in particular a suspension arm. Furthermore, the hydraulic bearing can be used as a bearing for units, for example for a motor. Furthermore, the hydraulic bearing can be used for resiliently bearing a cab of a construction or agricultural machine.

A hydraulic bearing is generally used if a relative movement of a component subject to oscillation, such as a motor vehicle component, relative to the vehicle body, is admitted and should be damped. On account of the use of elastomer material, the hydraulic bearing provides restoring spring forces as well as damping forces which are actively generated by means of dissipation losses in the bearing.

SUMMARY

The disclosure provides a new hydraulic bearing which allows for high damping performance in a wide frequency range.

The disclosure can be achieved by providing a hydraulic bearing according to the subject matter of the respective independent claims. Preferred embodiments are found in the dependent claims.

According to the embodiment of the present disclosure, a hydraulic bearing is provided which comprises an inner core and an outer shell which radially surrounds the inner core. The hydraulic bearing according to the embodiment of the disclosure furthermore comprises an elastomer body which resiliently interconnects the inner core and the outer shell in order to allow a relative displacement between the inner core and the outer shell. The hydraulic bearing furthermore comprises a first working chamber and a second working chamber, which are fluidically interconnected by means of a working channel. The hydraulic bearing furthermore comprises a bypass chamber which is connected to the first working chamber by means of a first bypass channel. The first working chamber and the second working chamber are configured such that an amount of a volume change in the case of a displacement of the inner core relative to the outer shell, in a predetermined radial direction, is larger for the first working chamber than for the second working chamber.

The configuration according to the disclosure advantageously makes it possible that, in the case of a displacement of the inner core relative to the outer shell in the predetermined radial direction, not only does a fluid exchange take place between the first working chamber and the second working chamber, via the working channel, but rather also a fluid exchange between the first working chamber and the bypass chamber, via the first bypass channel. Appropriate adjustment of the respective configurations of the working channel and the first bypass channel makes it possible to achieve damping peaks in two different frequency ranges, which allows for improved adjustability of the damping performance of the hydraulic bearing over the expected excitation frequency, in particular over a wide frequency range. The hydraulic bearing can also be referred to as a hydraulically damping bearing.

The bypass chamber can be connected to the first working chamber fluidically or in a pressure-transmitting manner, by means of the first bypass channel. Within the context of the present application "fluidically connected" can mean that a fluid, for example glycol, can flow from the first working chamber, via the first bypass channel, into the bypass chamber, and vice versa. In contrast, within the context of the present application "connected in a pressure-transmitting manner" can mean that a pressure change within the first working chamber is transmitted from the first working chamber, via the first bypass channel, into the bypass chamber, without a fluid exchange taking place between the first working chamber and the bypass chamber. The same applies analogously in the reverse direction. For example, in the case of a pressure-transmitting connection, resilient deformation or displacement or oscillation of a decoupling element arranged in the first or second bypass channel, such as a decoupling membrane or a decoupling plate, can cause the fluid located in the corresponding bypass channel to flow back and forth or oscillate, without fluid exchange taking place between the corresponding working chamber and the corresponding bypass chamber.

In the case of a relative movement of the inner core with respect to the outer shell, the volume of the first working chamber and of the second working chamber is reduced or increased. The different volume changes in the first working chamber and in the second working chamber lead to different pressure changes in the first working chamber and in the second working chamber. On account of the pressure changes in the two working chambers, the fluid located in the working chambers flows via the working channel, depending on the different pressures in the two working chambers, from one of the two working chambers into the other of the two working chambers, via the working channel, wherein dissipation losses arise. In other words, in the case of relative movements between the inner core and the outer shell, the fluid damps oscillations, wherein, depending on the configuration of the working channel, such as the cross section and/or the length of the working channel, a damping peak can arise in a (first) frequency range.

The relative movements between the inner core and the outer shell can also arise during operation of the hydraulic bearing in a second frequency range, which differs from the first frequency range. It may be desirable to also sufficiently damp oscillations in a second frequency range of this kind, in addition to the first frequency range. In the case of conventional hydraulic bearings, in which the first working chamber is connected merely to the second working chamber, by means of the working channel the damping performance in the second frequency range may be insufficient. It may even be the case that, in the second frequency range, the working channel blocks, on account of the configuration thereof, such that no fluid exchange between the first working chamber and the second working chamber can take place, and/or no more fluid can flow in the working channel, and thus no damping can any longer take place either, and the rigidity of the hydraulic bearing increases in this frequency range. Therefore, according to the disclosure, the first working chamber is additionally connected to the bypass chamber by means of the first bypass channel, and an amount of a volume change in the case of a displacement of the inner core relative to the outer shell, in the predetermined radial direction, is larger for the first working chamber than for the second working chamber. The volume change can be determined in particular in the case of a displacement about the zero position. In other words, in the case of the relative displacement, the active or effective piston surface is larger for the first working chamber than for the second working chamber. It is thus ensured that, in the case of a displacement of the inner core relative to the outer shell in the predetermined radial direction, the volume change in the first working chamber can be absorbed not only by the volume change in the second working chamber, such that a fluid and/or pressure transmission between the first working chamber and the bypass chamber via the first bypass channel takes place. The fluid and/or pressure transmission between the first working chamber and the bypass chamber, by means of the first bypass channel in particular also takes place if the working channel does not block at the respective excitation frequency. By adjusting the configuration of the bypass channel, such as the cross section and/or the length of the bypass channel, it is thus possible to achieve an additional damping peak occurring in a (second) frequency range, as a result of which it is possible to improve the damping performance of the hydraulic bearing over the anticipated excitation frequency. Furthermore, the dynamic rigidity of the hydraulic bearing can be reduced.

For improved clarity of the present disclosure, the following is explained: Within the context of this application, all direction specifications such as "above", "below", "longitudinal", "transverse", "horizontal" and "vertical", unless otherwise specified, refer to a three-dimensional cartesian reference coordinate system associated with the outer shell. The reference coordinate system is orientated such that an x-axis (longitudinal axis) of the three-dimensional cartesian reference coordinate system extends through a center point of the outer shell. The outer shell can be substantially rotationally symmetrical in shape, with respect to the x-axis. Therefore, the outer shell can be substantially cylindrical in shape and can extend both in the negative and in the positive x-direction, proceeding from a zero point of the cartesian reference coordinate system, wherein the outer shell can be of the same length in the negative and in the positive x-direction. In other words, the zero point of the cartesian reference coordinate system forms the center point of the outer shell. The specifications "upper", "lower" and "vertical" refer to a z-axis of the reference coordinate system, whereas the specification "longitudinal" refers to the x-axis of the cartesian reference coordinate system, and the specification "transverse" refers to a y-axis of the cartesian reference coordinate system. The predetermined radial direction can in particular be the z-direction. The outer shell may be part of a first component which is connected to the hydraulic bearing. Alternatively, the outer peripheral surface of the outer shell can serve as a mounting surface, in order to connect the hydraulic bearing to the first component.

The first working chamber may in particular be of a larger volume compared with the second working chamber, and may be located in the negative z-direction. In contrast, the second working chamber may be located in the positive z-direction. The volume of the first working chamber may be approximately 5-100%, preferably approximately 10-50%, most preferably approximately 30% larger than the volume of the second working chamber. The first working chamber and/or the second working chamber may have a substantially circular arc-shaped cross section in the yz-plane.

The inner core may be configured such that it is formed so as to be substantially mirror symmetric with respect to the xz-plane of the reference coordinate system. More precisely, the inner core may have a substantially wedge-shaped cross section or a substantially circular cross section in the yz-plane of the reference coordinate system. In this connection, "substantially wedge-shaped" means that the cross section of the inner core in the yz-plane has a first blunt end in the negative z-direction and a second blunt end in the positive z-direction, wherein the first blunt end in the transverse direction may be of a larger width than the first blunt end. The first blunt end may face the first working chamber. The cross section of the inner core in the yz-plane may be substantially in the shape of an isosceles trapezium. The first blunt end and/or the second blunt end may also be configured so as to be rounded. The inner core may comprise a longitudinal axis which substantially corresponds with or extends substantially in parallel with the longitudinal axis of the outer shell. In particular, the inner core can be arranged so as to be substantially concentric to the outer shell. The inner core may comprise a mounting recess or mounting hole which extends through the inner core, along the longitudinal axis of the inner core, wherein the hydraulic bearing can be connected to a second component by means of a mounting element, for example a screw, which is guided through the mounting recess. The axial extension of the inner core can substantially correspond to the axial extension of the outer shell. The elastomer body can be injection molded or vulcanized onto the inner core.

Alternatively, the first working chamber and the second working chamber may be substantially symmetrical in shape in the yz-plane, i.e. in the radial cross section, and differ from one another merely with respect to the length or extension thereof in the x-direction, i.e. the axial direction. According to this embodiment, a different volume of the two working chambers and a different piston surface of the corresponding pistons is achieved by the different lengths or extensions of the two working chambers in the x-direction. This embodiment offers the advantage that support arms provided on the elastomer body can be formed so as to be of the same length and same thickness, as a result of which the elastomer body is easier to manufacture and has improved robustness. Furthermore, it is possible to ensure, according to this embodiment, that a "zero position" of the elastomer body is maintained in the z- and y-direction in the event of shrinkage of the elastomer body.

The first working chamber and the second working chamber may be delimited by the outer shell, the inner core and the elastomer body. Alternatively, the elastomer body can surround the inner core such that the elastomer body and the outer shell define the first working chamber and the second working chamber. Further components can also be located between the elastomer body and the outer shell, in the radial direction. For example, an outer cage, which radially surrounds the inner core, may be arranged between the elastomer body and the outer shell. The outer cage may be substantially cylindrical in shape. The axial extension of the outer cage can substantially correspond to the axial extension of the outer shell and/or of the inner core. The outer cage may be embedded in the elastomer body, at least in part. The elastomer body can be injection molded or vulcanized onto the inner core and the outer cage. The outer cage may be connected to the outer shell by means of a crimped connection or press-fit, wherein material of the elastomer body can be arranged between the outer cage and the outer shell, at least in part. Alternatively, the outer cage may also be adhesively bonded or otherwise fastened to the inner peripheral surface of the outer shell.

The elastomer body may have a substantially x-shaped cross section in the yz-plane. More precisely, the elastomer body may be configured such that the cross section thereof in the yz-plane comprises four support arms extending from the inner core to the outer shell or outer cage. It is also conceivable for the elastomer body to comprise just two support arms. The support arm can also be referred to as spring arms.

The working channel connecting the first working chamber and the second working chamber can extend along an outer peripheral surface of the elastomer body, at least in part. More precisely, the elastomer body may comprise a depression or groove along the outer peripheral surface thereof, which forms the working channel. The inner peripheral surface of the outer shell can delimit or seal the working channel radially towards the outside. In the case of the optional outer cage being used, the outer cage may comprise a depression or groove along the outer peripheral surface thereof, which forms the working channel, wherein the depression may or also may not be covered by a layer of the material of the elastomer body. The working channel can extend in a circular arc-shaped manner, proceeding from the first working chamber, in the peripheral direction, towards the second working chamber, but can also comprise portions in which it extends for example in the axial direction along the peripheral surface of the elastomer body or of the outer cage. The working channel can also be formed, in part, in an insert part, which closes the first working chamber radially towards the outside, at least in part.

The length of the working channel and/or the cross section thereof may influence the damping properties of the hydraulic bearing. The length of the working channel can be increased, in that the working channel has a curved course or a zig-zag course. More precisely, the working channel may comprise a plurality of circular arc-shaped sub-portions which are arranged in parallel with one another in the x-direction. The working channel may have a substantially square or rectangular cross section, at least in portions, having a cross-sectional area of from approximately 2 mm2 to approximately 150 mm2, preferably from approximately 5 mm2 to approximately 100 mm2, most preferably from approximately 10 mm2 to approximately 50 mm2.

The first bypass channel connecting the first working chamber and the bypass chamber can extend along an outer peripheral surface of the elastomer body, at least in part. More precisely, the elastomer body may comprise a depression or groove along the outer peripheral surface thereof, which forms the bypass channel. The inner peripheral surface of the outer shell can delimit or seal the bypass channel radially towards the outside. In the case of the optional outer cage being used, the outer cage may comprise a depression or groove along the outer peripheral surface thereof, which forms the bypass channel, wherein the depression may or also may not be covered by a layer of the material of the elastomer body. The bypass channel can also be formed, in part or completely, in an insert part, which closes the first working chamber radially towards the outside, at least in part.

The length of the bypass channel and/or the cross section thereof may influence the damping properties of the hydraulic bearing. The length of the bypass channel can be increased, in that the bypass channel has a curved course or a zig-zag course. The bypass channel may have a substantially square or rectangular cross section, at least in portions, having a cross-sectional area of from approximately 5 mm2 to approximately 200 mm2, preferably from approximately 10 mm2 to approximately 150 mm2, most preferably from approximately 20 mm2 to approximately 100 mm2.

The hydraulic bearing preferably comprises a first sealing element which is arranged at a first axial end of the hydraulic bearing, in order to delimit the bypass chamber in the axial direction, at least in part.

Advantageously, providing the first seal element makes it possible for a gap between the outer shell and the inner core to be easily used as the bypass chamber.

The first seal element can be manufactured from a plastics material, at least in part, in particular an elastomer. The first seal element may be substantially discoid and may be connected radially internally to a first axial end of the inner core, and radially externally to a first axial end of the outer shell and/or of the outer cage, for example by means of a press-fit and/or adhesive bonding. For this purpose, the first seal element may comprise an outer fastening ring at the radial outside end thereof, and/or an inner fastening ring at the radial inside end thereof, wherein the outer fastening ring and/or the inner fastening ring may be formed of metal or plastics material. The first seal element may be formed in the manner of a membrane and/or in the manner of a bellows, at least in part. This offers the advantage that the first seal element allows for a low-resistance volume change of the bypass chamber. In particular, a wall thickness of the first seal element, measured at the thinnest point, may be substantially thinner than a wall thickness of the parts of the elastomer body which define the first working chamber or the second working chamber, measured at the thinnest point, for example less than approximately 20%, less than approximately 10%, or less than approximately 5%.

In this connection, the hydraulic bearing preferably comprises a second sealing element which is arranged at a second axial end of the hydraulic bearing, in order to delimit the bypass chamber in the axial direction, at least in part. The elastomer body optionally comprises at least one passage recess extending in the axial direction, which forms a part of the bypass chamber.

An embodiment of this kind makes it possible for a hydraulic bearing having a particularly large bypass chamber to be provided, which bypass chamber in particular extends over the entire axial length, between the axial ends of the hydraulic bearing. The second seal element can be configured in a manner analogous to the first seal element, wherein the statements above relating to the first seal element can apply correspondingly for the second seal element, in particular in view of the second axial end. This allows for a particularly large low-resistance volume change of the bypass chamber.

The bypass chamber is preferably additionally connected to the first working chamber by means of a first secondary bypass channel.

The above configuration offers the advantage that it is possible to even better adjust the damping properties of the hydraulic bearing over the excitation frequency. In particular, adjusting the configuration of the first secondary bypass channel, i.e. for example the arrangement, cross-sectional area and/or length of the first secondary bypass channel, makes it possible for a further (third) frequency range to be provided, in which a further damping peak arises. The first secondary bypass channel is in particular configured differently from the first bypass channel.

More preferably, the bypass chamber is connected to the second working chamber by means of the second bypass channel.

This offers the advantage of a further adjustment possibility of the damping properties of the hydraulic bearing over the excitation frequency. In particular, adjusting the configuration of the second bypass channel, i.e. for example the arrangement, cross-sectional area and/or length of the second bypass channel, makes it possible for a further (fourth) frequency range to be provided, in which a further damping peak arises.

The second bypass channel can be of a shape similar to the first bypass channel. It is also conceivable for the second bypass channel to differ from the first bypass channel, for example with respect to the configuration thereof, for example the length, cross-sectional area and/or cross-sectional shape thereof.

In this connection, the bypass chamber is preferably additionally connected to the second working chamber by means of a second secondary bypass channel.

The above configuration offers the advantage that it is possible to yet further adjust the damping properties of the hydraulic bearing over the excitation frequency. In particular, adjusting the configuration of the second secondary bypass channel, i.e. for example the arrangement, cross-sectional area and/or length of the second secondary bypass channel, makes it possible for a further (fifth) frequency range to be provided, in which a further damping peak arises. The second secondary bypass channel is in particular configured differently from the second bypass channel.

The bypass channels and secondary bypass channels can in each case be configured such that they extend substantially in the axial direction or x-direction of the bearing, at least in part, or such that they extend substantially in the peripheral direction of the bearing, at least in part, or such that they extend both substantially in the x-direction, in part, and substantially in the peripheral direction of the bearing, in part. The bypass channels and secondary bypass channels can in each case be delimited radially towards the outside by the outer shell. For example a configuration is conceivable in which the second bypass channel extends substantially in the x-direction, while the second secondary bypass channel extends substantially in the peripheral direction, i.e. within the yz-plane. Similar can apply for the first bypass channel and the first secondary bypass channel. An inverse configuration is also conceivable.

The bypass chamber is preferably divided into a first sub-bypass chamber and a second sub-bypass chamber. The first sub-bypass chamber can be connected to the first working chamber by means of the first bypass channel and/or the first secondary bypass channel (if provided). The second sub-bypass chamber can be connected to the second working chamber by means of the second bypass channel and/or the second secondary bypass channel (if provided).

The above configuration offers the advantage that two separate bypass chambers can be provided, which are each connected to the first working chamber by means of the first bypass channel and/or the first secondary bypass channel (if provided), and to the second working chamber by means of the second bypass channel and/or the second secondary bypass channel (if provided), which makes it possible to more precisely adjust the damping properties over the excitation frequency. The first sub-bypass chamber and the second sub-bypass chamber can be separated by a partition, wherein the partition may be part of the elastomer body. The partition can be configured such that substantially no pressure exchange takes place between the first sub-bypass chamber and the second sub-bypass chamber, via the partition. For example, the partition can extend substantially in the yz-plane or in parallel therewith, the first sub-bypass chamber can be delimited towards the outside, in the axial direction, by the first sealing element, at least in part, and the second sub-bypass chamber can be delimited towards the outside, in the axial direction, by the second sub-bypass chamber, at least in part. Alternatively thereto, the partition can also extend substantially in the xy-plane, or in parallel therewith.

A decoupling element is preferably arranged in the first bypass channel and/or in the first secondary bypass channel and/or in the second bypass channel and/or in the second secondary bypass channel. In other words, the above-mentioned channels can in each case be configured with or without a decoupling element. For example, it is possible that a decoupling element may be arranged only in the first bypass channel, while the second bypass channel and the secondary bypass channels, if present, may be free of decoupling elements. However, it is also possible, for example, for the first and the second bypass channel, as well as the first and the second secondary bypass channel, if provided, to each comprise a decoupling element.

Providing one or more decoupling elements yet further improves the adjustability of the damping properties of the hydraulic bearing. In particular, the dynamic rigidity of the hydraulic bearing can be purposely reduced, at a particular frequency or in a particular frequency range, by means of a decoupling element. The decoupling element can be configured as a freely swinging decoupling plate, which allows for both fluid and pressure transmission, or as a decoupling membrane, which is arranged in a sealing manner and allows only for pressure transmission. The decoupling element and the corresponding channel can be configured such that the decoupling element oscillates back and forth in a particular frequency range of the excitation, and thus allows for damping-generating flowing back and forth of the fluid in the channel, without or without notable fluid exchange between the corresponding chambers.

The hydraulic bearing preferably comprises a first insert part which is arranged between the elastomer body and the outer shell and delimits the first working chamber in part, wherein the first bypass channel is arranged in the first insert part, at least in part. The first secondary bypass channel is optionally arranged in the first insert part, at least in part.

The above configuration allows for simple provision of the first bypass channel and/or of the first secondary bypass channel. The radial inner surface of the first insert part can furthermore serve as a first radial stop for the inner core.

In this connection, the hydraulic bearing preferably comprises a second insert part which is arranged between the elastomer body and the outer shell and delimits the second working chamber in part, wherein the second bypass channel is arranged in the first insert part, at least in part. The second secondary bypass channel is optionally arranged in the first insert part, at least in part.

The above configuration allows for simple provision of the second bypass channel and/or of the second secondary bypass channel. The radial inner surface of the second insert part can furthermore serve as a second radial stop for the inner core. The first insert part and the second insert part can be arranged substantially at diametrical positions of the hydraulic bearing.

Alternatively to being arranged in the first and/or second insert part, the decoupling element can also be arranged at an axial end of the outer shell. In particular, the decoupling element can be clamped between the outer fastening ring of the seal element and an axial end portion of the outer cage, extending for example substantially in the axial direction. The decoupling element can also be arranged or clamped in a decoupling element fastening ring, so as to extend substantially in the radial direction, wherein the decoupling element fastening ring is pressed into the outer shell and/or clamped between the outer fastening ring of the seal element and an axial end portion of the outer cage.

In this connection, the respective decoupling element is preferably arranged in the first insert part and/or in the second insert part.

The above configuration allows for simple arrangement of the respective decoupling element in the first insert part and/or in the second insert part. In particular, the first insert part and/or the second insert part may be formed in multiple parts, for example formed in two parts, and enclose the corresponding decoupling element in the interior.

BRIEF DESCRIPTION OF THE DRAWINGS

Embodiments of the disclosure are described in detail in the following with reference to the accompanying drawings. Of course, the disclosure is not limited to these embodiments, but rather individual features which are disclosed within the context of the present description can be combined to form further embodiments. In the drawings.

DESCRIPTION OF EMBODIMENTS

Figure 1:
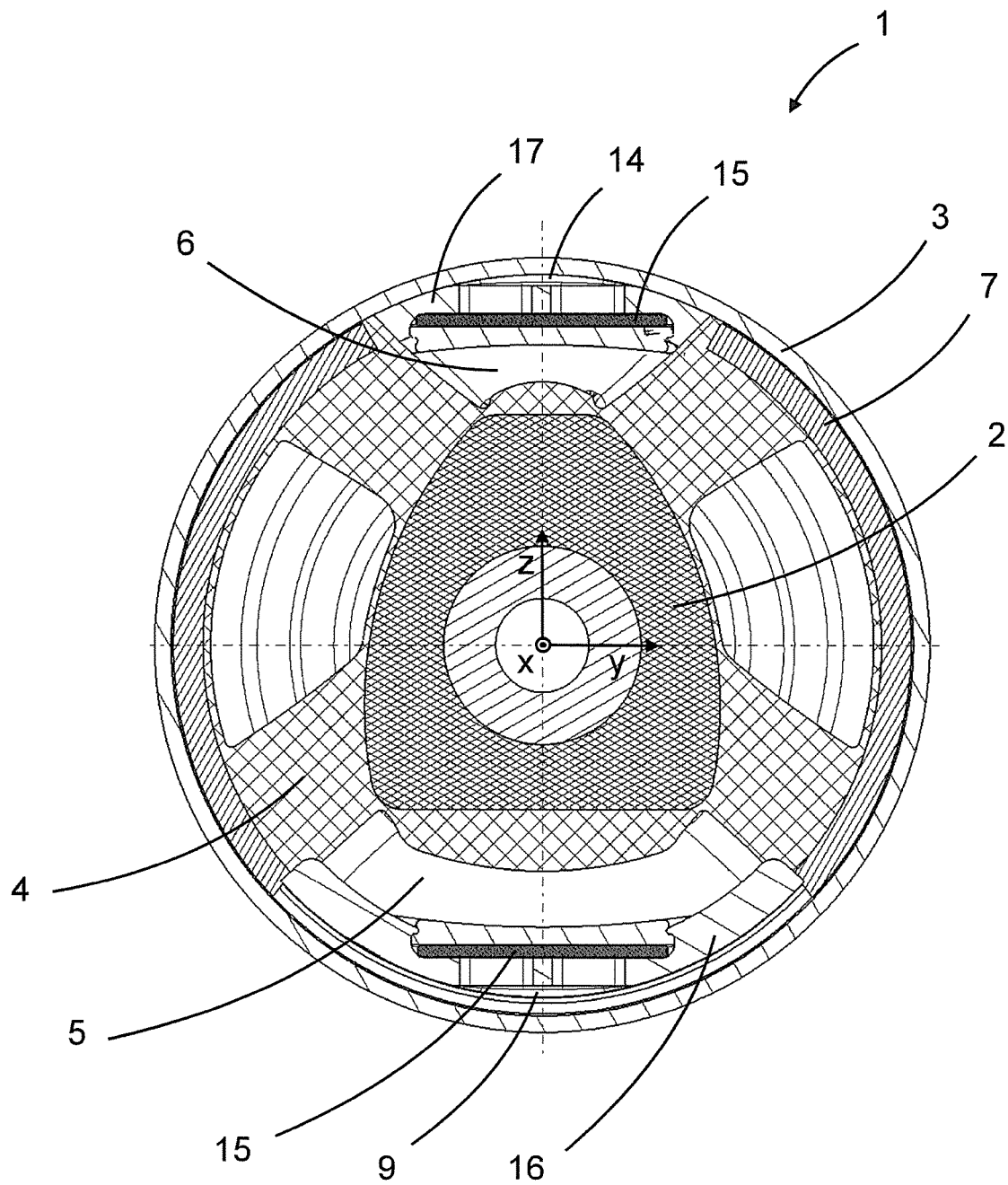
FIG. 1 is a schematic view of a cross section of a hydraulic bearing according to a first embodiment.

FIG. 1 is a cross section of a hydraulic bearing 1 in a yz-plane of a cartesian reference coordinate system associated with an outer shell 3 of the hydraulic bearing 1, the zero point of which system corresponds to a center point of the outer shell 3.

As can be seen from FIG. 1, the hydraulic bearing 1 comprises, in addition to the outer shell 3, an inner core 2, an outer cage 7, and an elastomer body 4 extending between the inner core 2 and the outer shell 3. The outer shell 3 is cylindrical in shape and surrounds the inner core 2 in the radial direction. In the present case, the outer shell 3 is made of metal, but can also comprise plastics material, at least in portions, in particular fiber-reinforced plastics material.

The inner core 2 comprises a tubular inner element having a circular cross section in the yz-plane, which extends in the x-direction, and a piston extending around the inner element, in the radial direction. The piston has a substantially wedge-shaped form in the yz-plane, and comprises a first blunt end and a second blunt end. The first blunt end located in the negative z-direction is wider, in the transverse direction, than the second blunt end located in the positive z-direction. Transverse flanks of the piston are configured so as to be rounded. The piston can be made of plastics material, and molded onto the inner element, which may be made of metal.

The elastomer body 4 resiliently interconnects the inner core 2 and the outer shell 3 or the outer cage 7, such that the inner core 2 is movable relative to the outer shell 3 or relative to the outer cage 7, respectively. The elastomer body 4 is substantially x-shaped in the yz-plane, comprising four support arms extending from the inner core 2 in the direction of the outer shell 3. The elastomer body 4 can be injection molded or vulcanized onto the outer cage 7 and onto the inner core 2. As can be seen from FIGS. 1 and 2, the elastomer body 4 substantially surrounds the inner core 2 in the radial direction.

The hydraulic bearing 1 furthermore comprises a first working chamber 5 and a second working chamber 6, which are fluidically interconnected by means of a working channel (not shown). As can be seen from FIGS. 1 and 2, the first working chamber 5 is located in the negative z-direction. In contrast, the second working chamber is located in the positive z-direction. A first insert part 16 is arranged between the elastomer body 4 and the outer shell 2, in the negative z-direction. Furthermore, a second insert part 17 is arranged between the elastomer body 4 and the outer shell 3, in the positive z-direction. The first working chamber 5 is consequently delimited by the elastomer body 4 and the first insert part 16. In contrast, the second working chamber 6 is delimited by the elastomer body 4 and the second insert part 17.

The outer cage 7 is substantially tubular in shape, having a substantially circular cross section. The outer cage 7 comprises two recesses at two radially outer regions, wherein the first insert part 15 can be inserted in a precisely fitting manner into one of the two recesses, and the second insert part 17 can be inserted in a precisely fitting manner into the other of the two recesses, such that the insert parts can rest on the outer cage 7, at least indirectly, by means of the elastomer body 4.

The present elastomer body 4, which is manufactured as injection molded part and surrounds the piston of the inner core 2, comprises a first piston surface in the region of the first blunt end of the piston of the inner core 2. In contrast, the elastomer body 4 comprises a second piston surface in the region of the second blunt end of the piston of the inner core. In other words, the first piston surface and the second piston surface of the elastomer body 4 each constitute an extension of the piston of the inner core 2. In the case of a relative movement of the inner core 2 with respect to the outer shell 3, in particular in the z-direction, the first piston surface and the second piston surface change the volume of the first working chamber 5 and of the second working chamber 6, depending on the direction of movement of the in particular 2 and/or of the outer shell 3. For example, in the case of a displacement of the inner core 2 in the positive z-direction, the second piston surface of the elastomer body 4 is displaced, together with the first piston surface of the elastomer body 4, in the positive z-direction. Consequently, the volume of the second working chamber 6 is reduced, while the volume of the first working chamber 5 is increased, wherein an amount of the corresponding volume change for the first working chamber 6 is larger than for the second working chamber 6. In other words, in the case of said displacement of the inner core 2, the volume of the first working chamber 6 is increased more than the volume of the second working chamber is reduced. Similar applies in the case of a displacement of the inner core 2 in the negative z-direction.

The different volume changes in the first working chamber 5 and in the second working chamber 6 lead to different pressure changes in the first working chamber 5 and in the second working chamber 6. On account of the pressure changes in the two working chambers 5, 6, the fluid located in the working chambers 5, 6 flows via the working channel, depending on the different pressures in the two working chambers 5, 6, from one of the two working chambers 5, 6 into the other of the two working chambers 6, 5. When the fluid flows from one working chamber into the other, via the working channel, dissipation losses arise in the working channel, which bring about damping for example of relative movements or oscillations between a unit (not shown) of a vehicle which is fastened to the hydraulic bearing 1, and a body (not shown) of the vehicle which is also coupled to the hydraulic bearing 1. The damping performance may have a damping peak, at a particular frequency or in a first frequency range.

Figure 2:
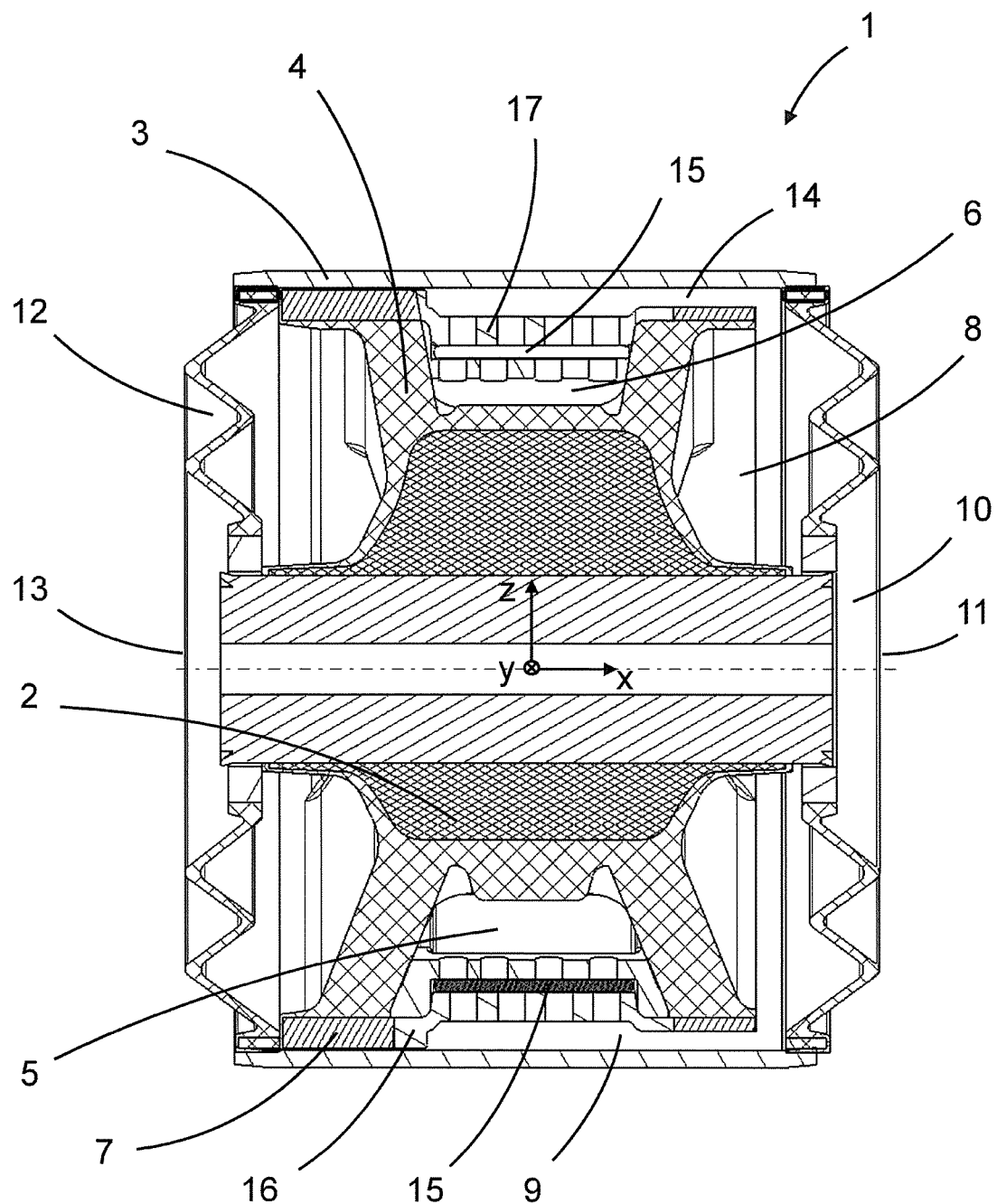
FIG. 2 is a schematic view of a further cross section of the hydraulic bearing according to the first embodiment.

As can be seen in FIGS. 1 and 2, the hydraulic bearing 1 according to the first embodiment is configured such that a first bypass channel 9 is arranged between the inner peripheral surface of the outer shell 3, the cage 7, and the first insert part 16. Furthermore, a second bypass channel 14 is arranged between the inner peripheral surface of the outer shell 3, the cage 7, and the second insert part 14. The first bypass channel 9 and the second bypass channel 14 extend substantially in the positive x-direction and lead into a bypass chamber 8 located in the positive x-direction.

The bypass chamber 8 is delimited in the positive x-direction by a first seal element 10 arranged at a first axial end 11 of the hydraulic bearing 1. The first seal element 10, comprising an elastomer, is formed in the manner of a bellows, so as to allow for a low-resistance volume change of the bypass chamber by a deformation of the first seal element 10. In the present case, a second seal element 12 formed in the manner of a bellows, which likewise comprises an elastomer, is likewise located at a second axial end 13 of the hydraulic bearing 1 opposite the first axial end 10 of the hydraulic bearing 1.

The first insert part 16 comprises at least one recess or cut-out extending in the z-direction, which interconnects the first working chamber 5 and the first bypass channel 9. The first insert part 16 can in particular comprise two, three, or, as in the present case, four, recesses. According to the first embodiment, a decoupling element 15 is located inside the four recesses, which decoupling element is configured as a flexible decoupling membrane and fluidically separates the first working chamber 5 from the bypass chamber 8. However, the first working chamber 5 and the bypass chamber 8 are still interconnected in a pressure-transmitting manner by means of the first bypass channel 9. The second insert part 17 is configured analogously to the first insert part 16 and likewise comprises a decoupling element 15 which fluidically separates the second working chamber 6 from the bypass chamber 8. However, the second working chamber 6 is still connected in a pressure-transmitting manner to the bypass chamber 8, by means of the second bypass channel 14. The configuration of the insert parts 16, 17, the bypass channels 9, 14, and the decoupling elements 15, 16 can be varied, depending on requirements and the available installation space. As can be seen in FIGS. 1 and 2, in the present case the two insert parts 16, 17 are in each case formed in two parts, such that the respective decoupling element 15, inserted into the insert parts 16, 17, can be easily inserted and/or changed.

Figure 3:
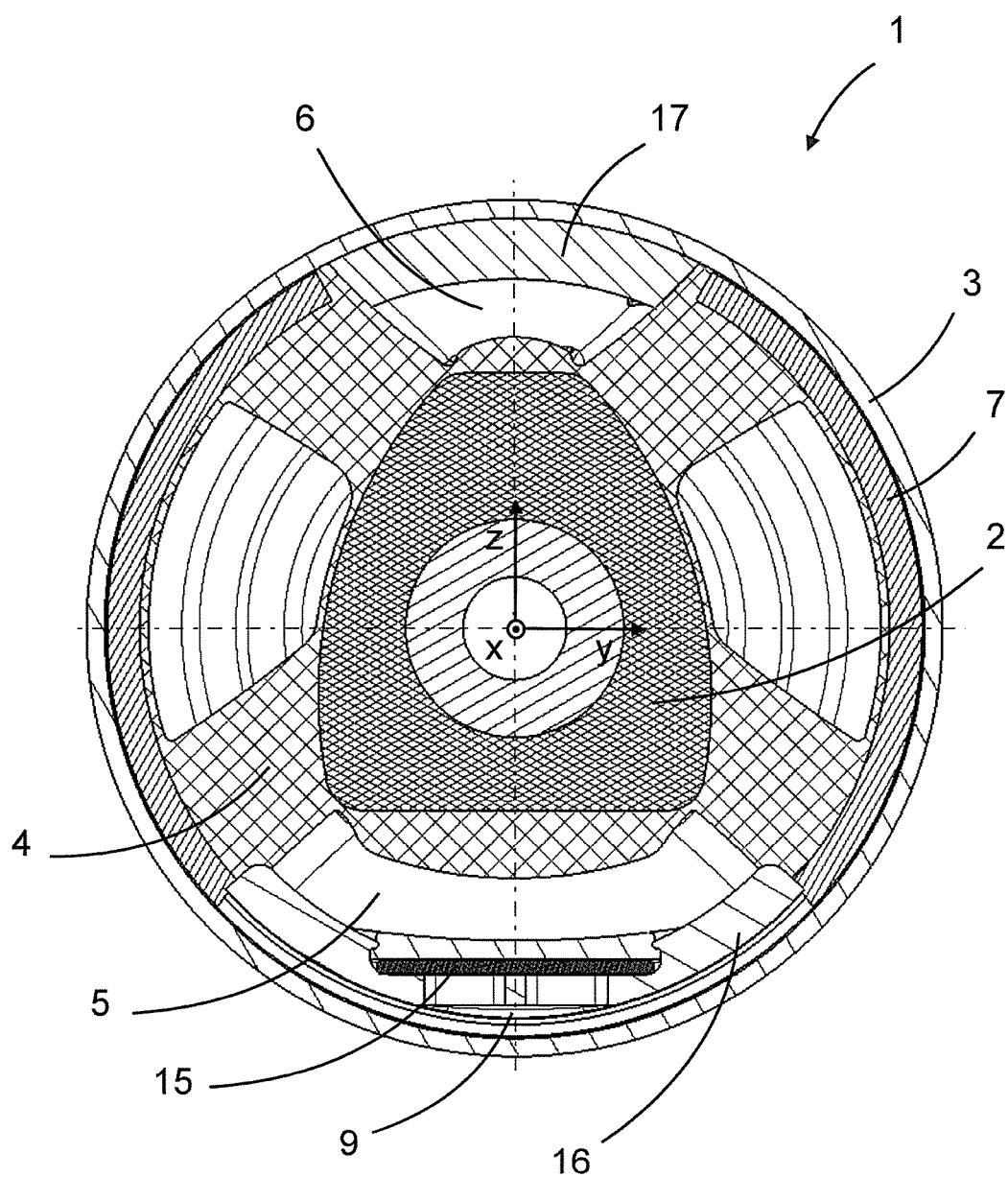
FIG. 3 is a schematic view of a cross section of a hydraulic bearing according to a second embodiment.
Figure 4:
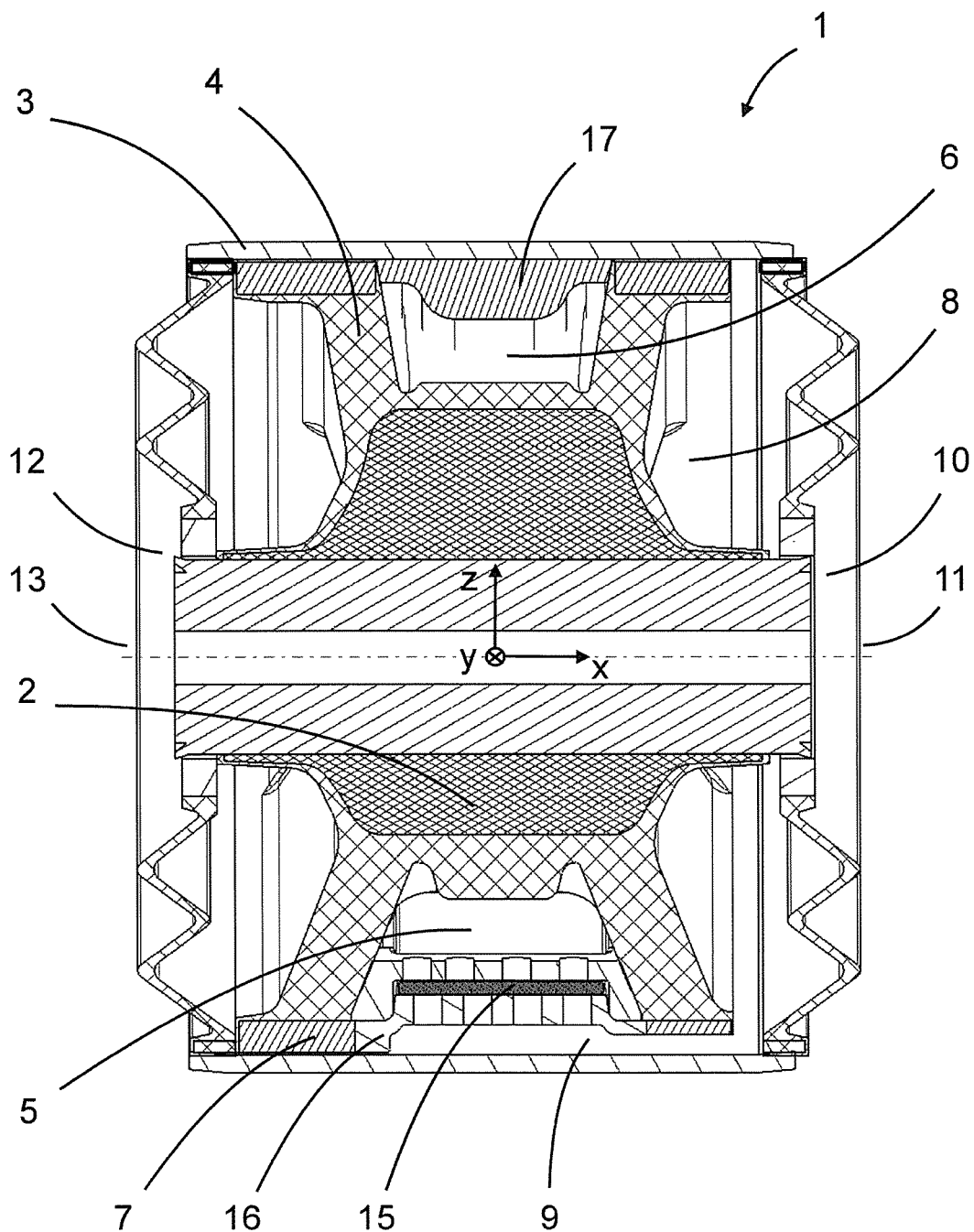
FIG. 4 is a schematic view of a further cross section of the hydraulic bearing according to the second embodiment.

FIGS. 3 and 4 show a hydraulic bearing 1 according to the disclosure, according to a second embodiment. The hydraulic bearing 1 according to the second embodiment corresponds in large part to the configuration having the configuration of the hydraulic bearing 1 according to the first embodiment. Therefore, in the following, only the differences existing between the two embodiments will be described in greater detail.

Unlike the hydraulic bearing 1 according to the first embodiment, the hydraulic bearing 1 according to the second embodiment comprises just one insert part 17. Furthermore, the bypass chamber 8 according to the second embodiment is connected to the first working chamber 5 merely by means of the first bypass channel 9. Unlike in the case of the hydraulic bearing 1 according to the first embodiment, in the case of the hydraulic bearing 1 according to the second embodiment the second working chamber 6 is not connected to the bypass chamber 8. The hydraulic bearing 1 according to the second embodiment therefore does not comprise a second bypass channel 14.

The damping of oscillations with the first frequency range takes place, according to the second embodiment, in a manner analogous to the first embodiment, by means of the fluid which can flow between the first working chamber 5 and the second working chamber 6, via the working channel. In contrast, oscillations in the second frequency range are damped merely by means of the fluid flowing in the first bypass channel 9. An embodiment of this kind is advantageous on account of the simple construction thereof.

Figure 5:
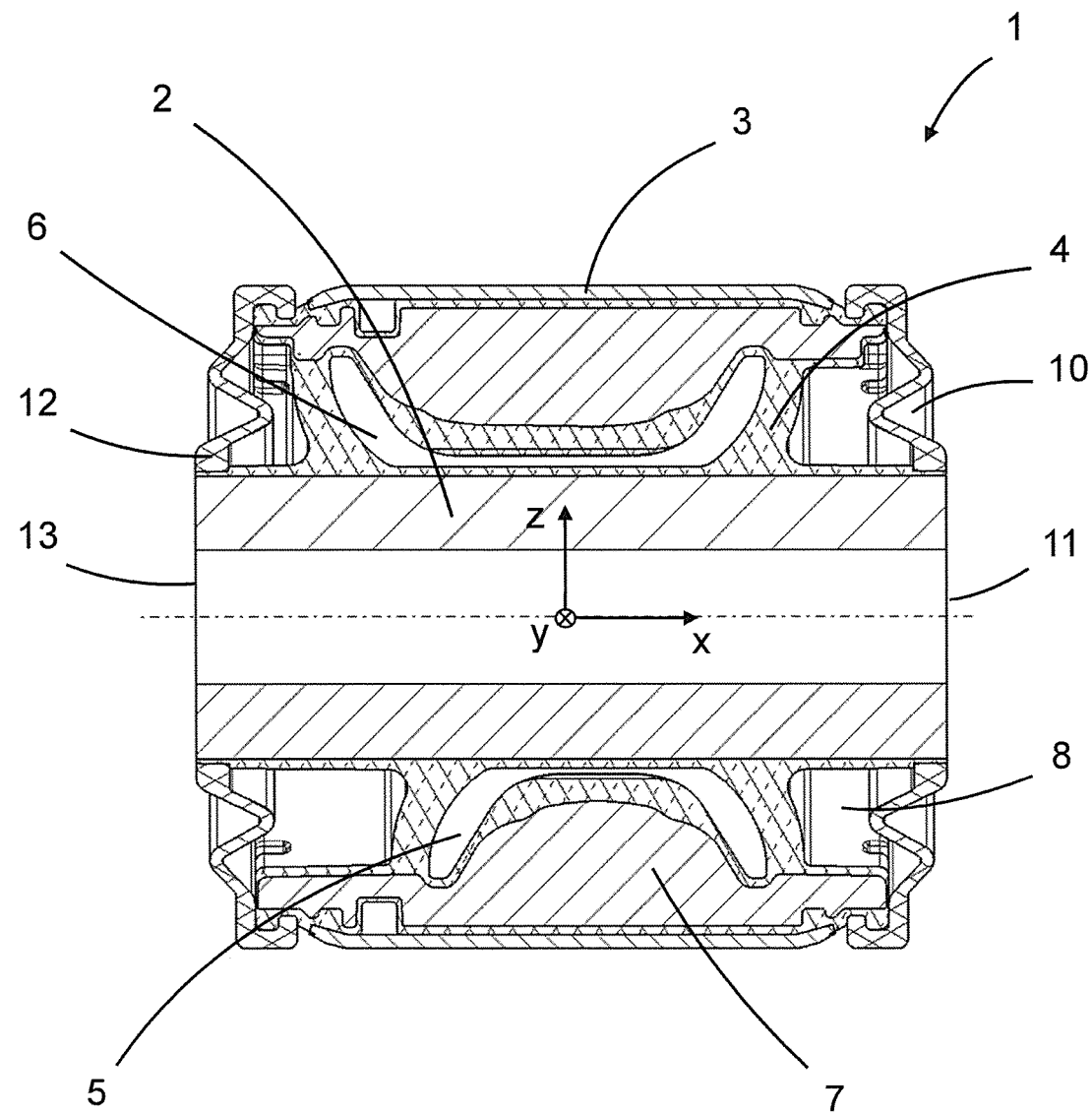
FIG. 5 is a schematic view of a cross section of a hydraulic bearing according to a third embodiment.

FIG. 5 shows a hydraulic bearing 1 according to a third embodiment, in which the first working chamber 5 and the second working chamber 6 are substantially symmetrical in shape in the yz-plane, i.e. in the radial cross section in the center point of the hydraulic bearing, and differ from one another merely with respect to the length or extension thereof in the x-direction. According to this embodiment, a different volume of the two working chambers 5, 6 is achieved by the different lengths or extensions of the two working chambers 5, 6 in the x-direction. As can be seen in FIG. 5, the outer cage 7 according to this embodiment is surrounded or encased, radially internally and radially externally, at least in portions, by the elastomer body 4. The substantially symmetrical configuration of the working chambers 5, 6 in radial cross section offers the advantage that the support arms provided in the elastomer body 4 can likewise be formed so as to be substantially symmetrical, in particular substantially of the same length and same thickness, as a result of which the elastomer body 4 is easier to manufacture and has improved robustness. Furthermore, it is possible to ensure, according to this embodiment, that a "zero position" of the elastomer body 4 is maintained in the z- and y-direction in the event of shrinkage of the elastomer body 4.

Figure 6:
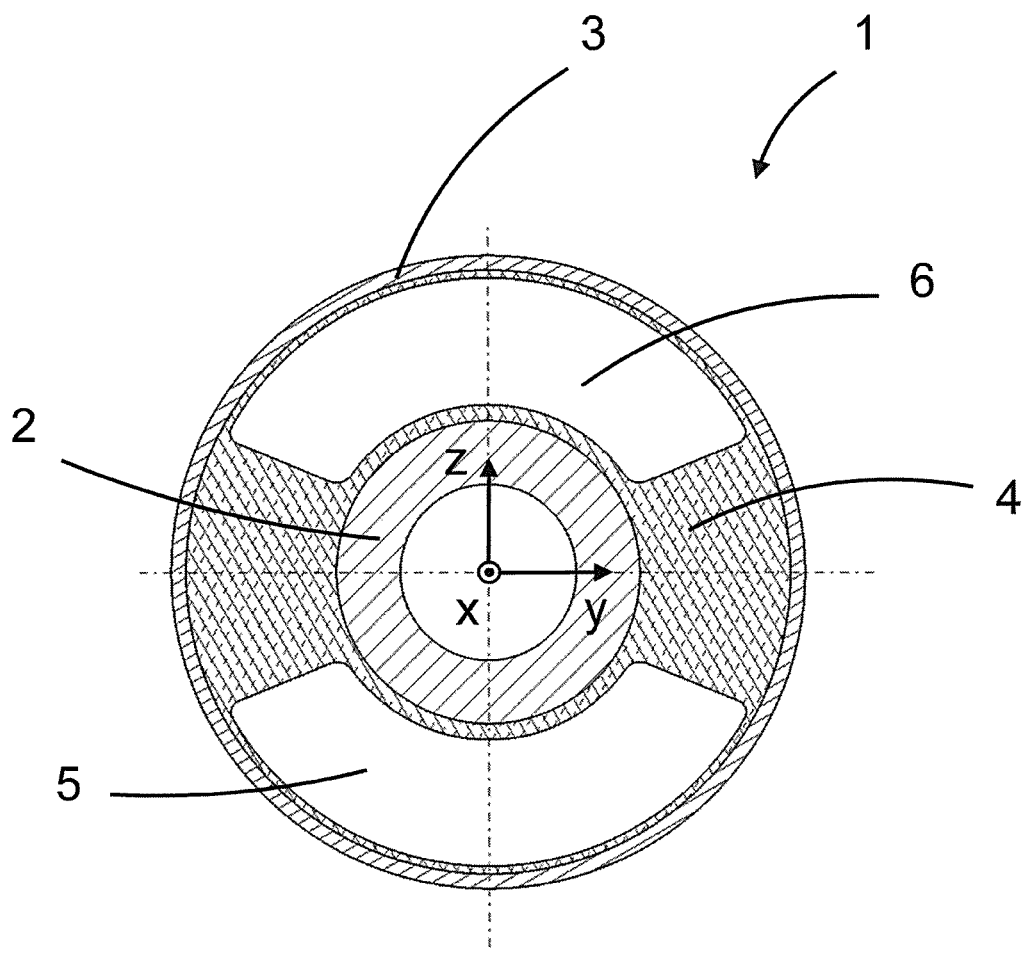
FIG. 6 is a schematic view of a cross section of a hydraulic bearing comprising an elastomer body having two support arms.
Figure 7:
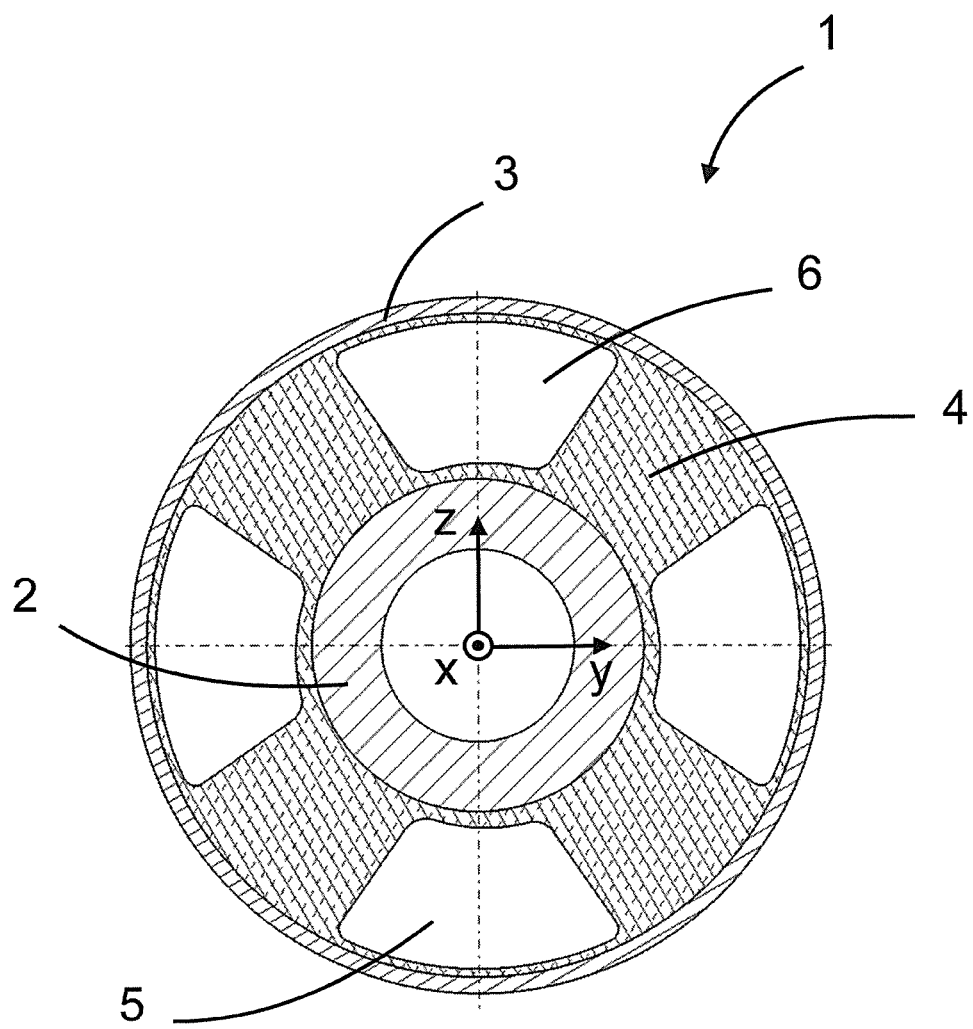
FIG. 7 is a schematic view of a cross section of a hydraulic bearing comprising an elastomer body having four support arms.

FIGS. 6 and 7 each show, in simplified form, the way in which the elastomer body 4 of the hydraulic bearing 1 can be configured, in radial cross section, with respect to the support arms thereof, according to the third embodiment. In this connection, "in simplified form" means that the outer cage 7 and certain portions of the elastomer body 4 are not shown.

As can be seen in FIG. 6, the elastomer body 4 may comprise just two mutually opposing support arms of substantially the same thickness and the same width, such that the first working chamber 5 and the second working chamber 6 are configured so as to be symmetrical with respect to one another in the yz-plane.

As is clear from FIG. 7, however, the elastomer body 4 may also comprise four support arms which are configured so as to be x-shaped in the yz-plane, wherein the four support arms are of a substantially identical thickness and identical width in each case, and are arranged such that the first working chamber 5 and the second working chamber 6 are configured so as to be symmetrical with respect to one another in the yz-plane.

Figure 8:
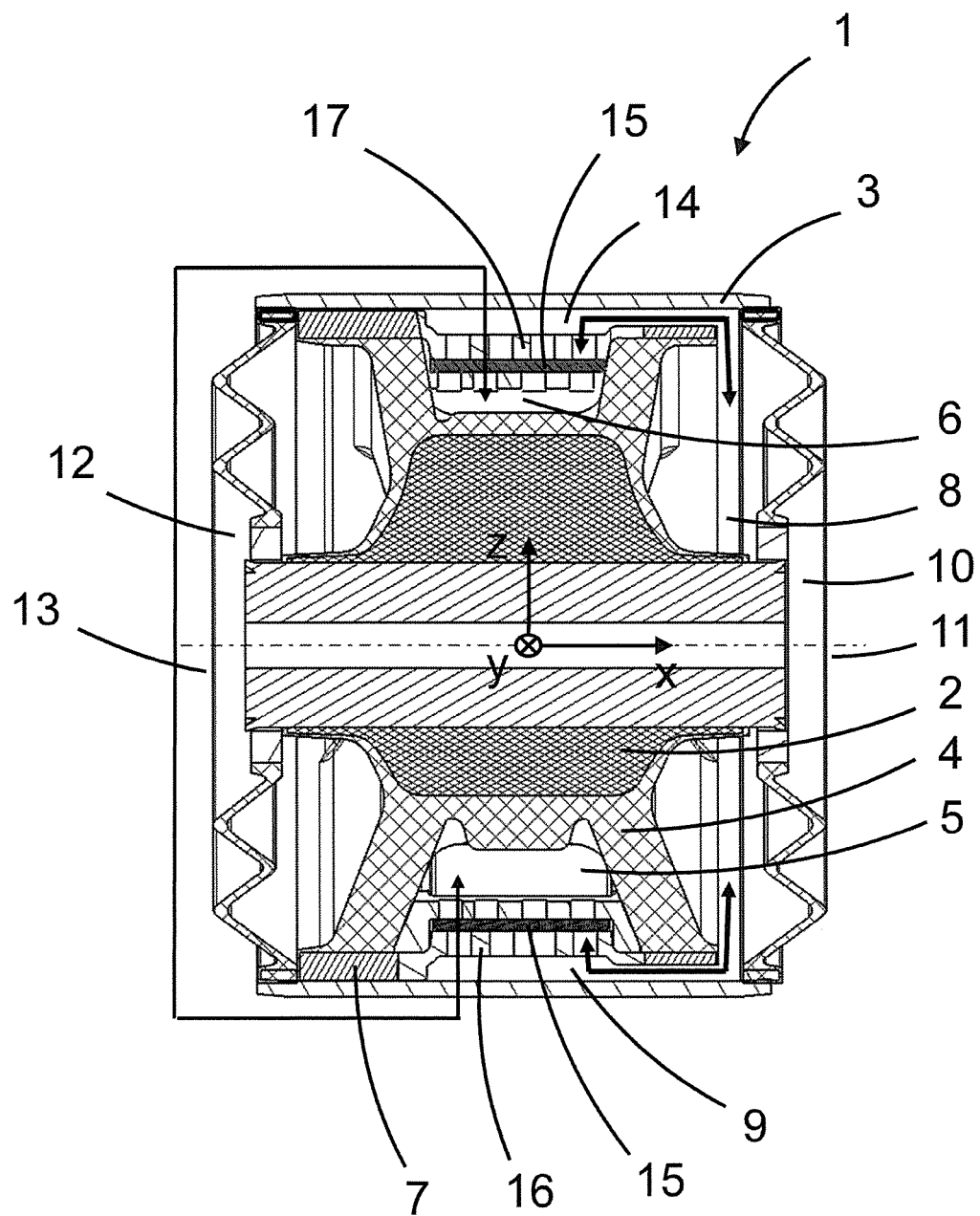
FIG. 8 is a schematic view of a cross section of the hydraulic bearing according to the first embodiment, with various channels and fluid flow directions labelled.

FIG. 8 shows the hydraulic bearing 1 according to the first embodiment, with labelled flow directions. As can be seen in FIG. 8, the first working chamber 5 and the second working chamber 6 are fluidically interconnected, such that a fluid exchange can take place between the two working chambers 5, 6 and oscillations of the hydraulic bearing 1 in a first frequency range can be damped during operation. In contrast, the first working chamber 5 and the second working chamber 6 are in each case connected in a pressure-transmitting manner to the bypass chamber 8, by means of a bypass channel 9, 14. In this case, the bypass chamber 8 can be divided into a first sub-bypass chamber and into a second sub-bypass chamber, such that the first sub-bypass chamber and the second sub-bypass chamber are separated from one another by a wall which extends substantially in the xy-plane, proceeding from the inner core 2, in the y-direction. Deformations or oscillations of the decoupling element 15 arranged in the first insert part 16, on account of pressure changes in the first working chamber 5, result in the fluid located in the first bypass channel 9 oscillating or flowing back and forth inside the first bypass channel 9, such that oscillations of the hydraulic bearing 1 in a second frequency range can be damped. Deformations or oscillations of the decoupling element 15 arranged in the second insert part 17, on account of pressure changes in the second working chamber 6, result in the fluid located in the second bypass channel 14 oscillating or flowing back and forth inside the second bypass channel 14, such that oscillations of the hydraulic bearing 1 in a further frequency range can be damped. In particular, the first bypass channel 9 and the second bypass channel 14, and/or the decoupling element 15 of the first bypass channel 9 and the decoupling element 15 of the second bypass channel 14 can be configured differently, in order to set the respective frequency ranges.

Figure 9:
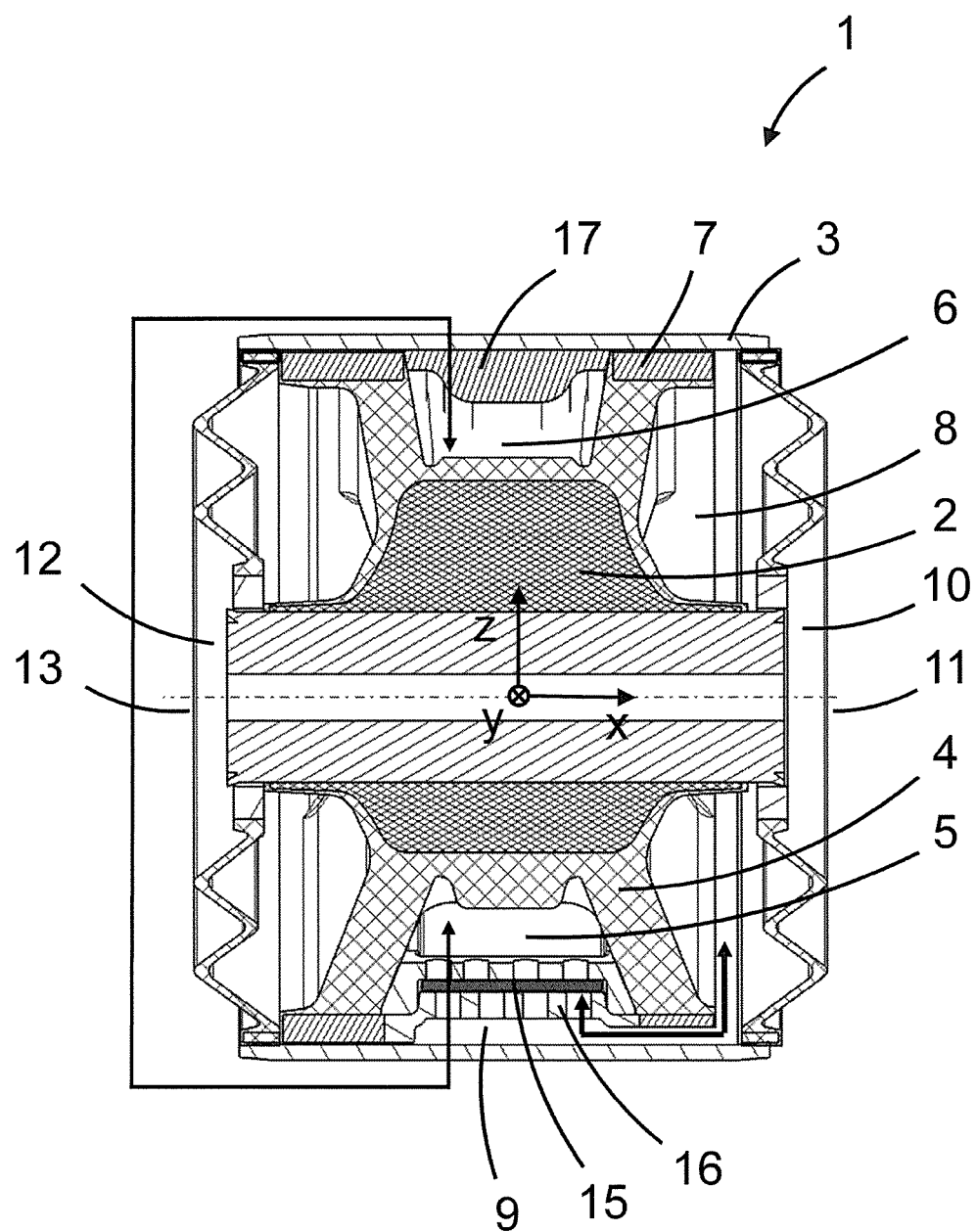
FIG. 9 is a schematic view of a cross section of the hydraulic bearing according to the second embodiment, with various channels and fluid flow directions labelled.

FIG. 9 shows the hydraulic bearing 1 according to the second embodiment, with labelled flow directions. As can be seen in FIG. 9, the first working chamber 5 and the second working chamber 6 are fluidically interconnected, such that a fluid exchange can take place between the two working chambers 5, 6 and oscillations of the hydraulic bearing 1 in a first frequency range can be damped during operation. In contrast, the first working chamber 5 is connected to the bypass chamber 8 in a pressure-transmitting manner. Deformations or oscillations of the decoupling element 15 arranged in the first insert part 16, on account of pressure changes in the first working chamber 5, result in the fluid located in the first bypass channel 9 oscillating or flowing back and forth inside the first bypass channel 9, such that oscillations of the hydraulic bearing 1 in a second frequency range can be damped.

What is claimed is:
1. A hydraulic bearing (1), comprising:
an inner core (2),
an outer shell (3), which radially surrounds the inner core (2),
an elastomer body (4) which resiliently interconnects the inner core (2) and the outer shell (3) in order to allow a relative displacement between the inner core (2) and the outer shell (3),
a first working chamber (5) and a second working chamber (6), which are fluidically interconnected by means of a working channel,
a bypass chamber (8) which is connected to the first working chamber (5) by means of a first bypass channel (9),
wherein the first working chamber (5) and the second working chamber (6) are configured such that an amount of a volume change in the case of a displacement of the inner core (2) relative to the outer shell (3), in a predetermined radial direction, is larger for the first working chamber (5) than for the second working chamber (6),
a first sealing element (10), wherein the first sealing element (10) is arranged at a first axial end (11) of the hydraulic bearing (1), in order to delimit the bypass chamber (8) in the axial direction, at least in part, and
a second sealing element (12), wherein the second sealing element (12) is arranged at a second axial end (13) of the hydraulic bearing, in order to delimit the bypass chamber (8) in the axial direction, at least in part.

2. The hydraulic bearing (1) according to claim 1, wherein the elastomer body (4) comprises at least one passage recess which forms a part of the bypass chamber (8).

3. The hydraulic bearing (1) according to claim 1, wherein the bypass chamber (8) is additionally connected to the first working chamber by means of a first secondary bypass channel.

4. The hydraulic bearing (1) according to claim 1, wherein the bypass chamber (8) is connected to the second working chamber (6) by means of a second bypass channel (14).

5. The hydraulic bearing (1) according to claim 4, wherein the bypass chamber (8) is additionally connected to the second working chamber (6) by means of a second secondary bypass channel.

6. The hydraulic bearing (1) according to claim 4, wherein the bypass chamber (8) is divided into a first sub-bypass chamber and a second sub-bypass chamber, wherein the first sub-bypass chamber is connected to the first working chamber (5) by means of the first bypass channel (9) and/or a first secondary bypass channel, and the second sub-bypass chamber is connected to the second working chamber (6) by means of the second bypass channel (14) and/or a second secondary bypass channel.

7. The hydraulic bearing (1) according to claim 1, wherein a decoupling element (15) is arranged in the first bypass channel (9) and/or in a first secondary bypass channel and/or in the second bypass channel (14) and/or in a second secondary bypass channel.

8. The hydraulic bearing (1) according to claim 1, further comprising a first insert part (16) which is arranged between the elastomer body (4) and the outer shell (3) and delimits the first working chamber (5) in part, wherein the first bypass channel (9) is arranged in the first insert part (16), at least in part, and wherein a first secondary bypass channel is optionally arranged in the first insert part (16), at least in part.

9. The hydraulic bearing (1) according to claim 8, further comprising a second insert part (17) which is arranged between the elastomer body (4) and the outer shell (3) and delimits the second working chamber (6) in part, wherein the second bypass channel (14) is arranged in the second insert part (17), at least in part, and wherein the second secondary bypass channel is optionally arranged in a second insert part (17), at least in part.

10. The hydraulic bearing (1) according to claim 8, wherein the respective decoupling element (15) is arranged in the first insert part (16) and/or in the second insert part (17).

11. A hydraulic bearing (1), comprising:
- an inner core (2),
- an outer shell (3), which radially surrounds the inner core (2),
- an elastomer body (4) which resiliently interconnects the inner core (2) and the outer shell (3) in order to allow a relative displacement between the inner core (2) and the outer shell (3),
- a first working chamber (5) and a second working chamber (6), which are fluidically interconnected by means of a working channel,
- a bypass chamber (8) which is connected to the first working chamber (5) by means of a first bypass channel (9), wherein the first working chamber (5) and the second working chamber (6) are configured such that an amount of a volume change in the case of a displacement of the inner core (2) relative to the outer shell (3), in a predetermined radial direction, is larger for the first working chamber (5) than for the second working chamber (6), and wherein the first working chamber (5) and the second working chamber (6) have a substantially symmetric shape in the yz plane and differ from each other in terms of its length in an axial direction of the outer sleeve (3).

* * * * *